(12) United States Patent
Yao et al.

(10) Patent No.: US 11,315,736 B2
(45) Date of Patent: Apr. 26, 2022

(54) MULTILAYER CERAMIC CAPACITOR

(71) Applicant: Murata Manufacturing Co., Ltd., Nagaokakyo (JP)

(72) Inventors: Yuichiro Yao, Nagaokakyo (JP); Keisuke Fukumura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 40 days.

(21) Appl. No.: 16/899,628

(22) Filed: Jun. 12, 2020

(65) Prior Publication Data

US 2020/0411246 A1 Dec. 31, 2020

(30) Foreign Application Priority Data

Jun. 27, 2019 (JP) .............................. JP2019-119470

(51) Int. Cl.
| | |
|---|---|
| *H01G 4/30* | (2006.01) |
| *H01G 4/008* | (2006.01) |
| *H01G 4/232* | (2006.01) |
| *H01G 4/248* | (2006.01) |
| *H01G 4/12* | (2006.01) |

(52) U.S. Cl.
CPC .............. *H01G 4/30* (2013.01); *H01G 4/008* (2013.01); *H01G 4/2325* (2013.01); *H01G 4/248* (2013.01); *H01G 4/1227* (2013.01)

(58) Field of Classification Search
CPC ........ H01G 4/012; H01G 4/1227; H01G 4/33; H01G 4/248; H01G 4/30; H01G 4/008; H01G 4/2325
See application file for complete search history.

(56) References Cited

U.S. PATENT DOCUMENTS

| | | | |
|---|---|---|---|
| 6,205,014 B1 | 3/2001 | Inomata et al. | |
| 2009/0161293 A1* | 6/2009 | Takeuchi | H01G 4/005 361/321.4 |
| 2015/0348712 A1* | 12/2015 | Lee | H01G 4/248 174/260 |
| 2016/0126014 A1* | 5/2016 | Lee | H01G 4/1209 361/301.4 |
| 2020/0035416 A1* | 1/2020 | Kwon | H01G 4/1227 |
| 2020/0135397 A1* | 4/2020 | Park | H01G 4/30 |

FOREIGN PATENT DOCUMENTS

JP 11-317322 A 11/1999

* cited by examiner

*Primary Examiner* — Michael P McFadden
(74) *Attorney, Agent, or Firm* — Keating & Bennett, LLP

(57) ABSTRACT

A multilayer body of a multilayer ceramic capacitor includes first and second side margin portions that each have an average amount of grain boundary segregation of Ni larger than that an average amount of grain boundary segregation of Ni in a plurality of dielectric layers at a portion located in an inner layer portion of the multilayer body.

13 Claims, 11 Drawing Sheets

MULTILAYER CERAMIC CAPACITOR

CROSS REFERENCE TO RELATED APPLICATIONS

This application claims the benefit of priority to Japanese Patent Application No. 2019-119470 filed on Jun. 27, 2019. The entire contents of this application are hereby incorporated herein by reference.

BACKGROUND OF THE INVENTION

1. Field of the Invention

The present invention relates to a multilayer ceramic capacitor.

2. Description of the Related Art

As a prior art document disclosing a structure of a multilayer ceramic capacitor, Japanese Patent Laid-Open No. 11-317322 discloses a multilayer ceramic capacitor including a dielectric layer made of $BaTiO_3$-based ceramic particles, and an internal electrode made by firing a conductive paste containing Ni powder as a major component.

When the dielectric layer is formed of abnormally grown dielectric grains, the resulting multilayer ceramic capacitor may have a reduction in moisture resistance and heat resistance.

SUMMARY OF THE INVENTION

Preferred embodiments of the present invention provide multilayer ceramic capacitors each including a dielectric layer in which abnormal grain growth of dielectric grains is significantly reduced or prevented to thus significantly reduce or prevent a reduction in moisture resistance and heat resistance.

A multilayer ceramic capacitor according to a preferred embodiment of the present invention includes a multilayer body, a first external electrode, and a second external electrode. The multilayer body includes a plurality of dielectric layers and a plurality of internal electrode layers that are alternately stacked in a layer stacking direction. The multilayer body includes a first major surface and a second major surface opposite to each other in the layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to both the layer stacking direction and the widthwise direction. The first external electrode is provided on the first end surface. The second external electrode is provided on the second end surface. The plurality of internal electrode layers include a first internal electrode layer electrically connected to the first external electrode and a second internal electrode layer electrically connected to the second external electrode. The multilayer body includes an inner layer portion, a first outer layer portion, a second outer layer portion, a first side margin portion, and a second side margin portion. In the inner layer portion, the first and second internal electrode layers include portions, respectively, facing each other and stacked in the layer stacking direction to have a capacitance. The first outer layer portion is located on a side of the inner layer portion closer to the first major surface in the layer stacking direction. The second outer layer portion is located on a side of the inner layer portion closer to the second major surface in the layer stacking direction. The first side margin portion is located on a side of the inner layer portion closer to the first side surface in the widthwise direction. The second side margin portion is located on a side of the inner layer portion closer to the second side surface in the widthwise direction. The plurality of internal electrode layers each include Ni. The plurality of dielectric layers each include Ni. The first and second side margin portions each have an average amount of grain boundary segregation of Ni larger than that of grain boundary segregation of Ni in the plurality of dielectric layers at a portion located in the inner layer portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
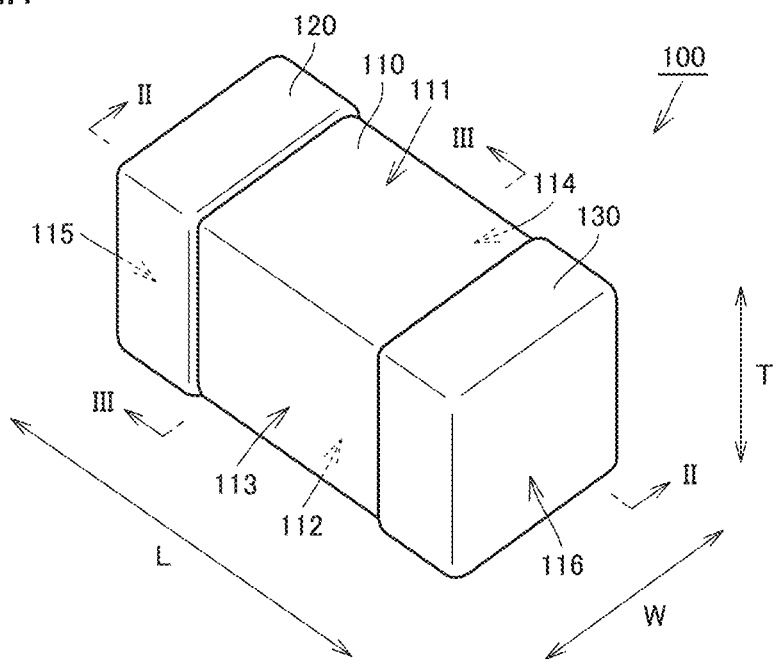
FIG. 1 is a perspective view of an appearance of a multilayer ceramic capacitor according to a preferred embodiment of the present invention.

Hereinafter, multilayer ceramic capacitors according to preferred embodiments of the present invention will be described with reference to the drawings. In the drawings, identical or equivalent components will identically be denoted, and will not be described repeatedly in the following description of the preferred embodiment.

Figure 2:
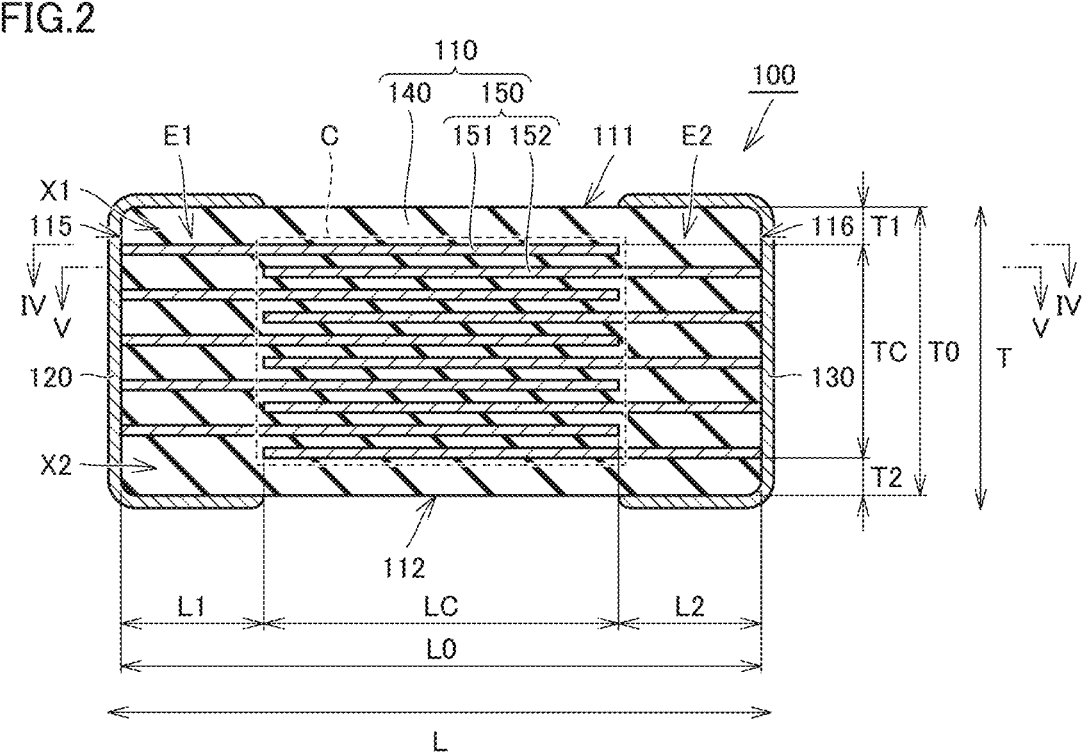
FIG. 2 is a cross section of the multilayer ceramic capacitor of FIG. 1 as seen in the direction of an arrow II-II.
Figure 3:
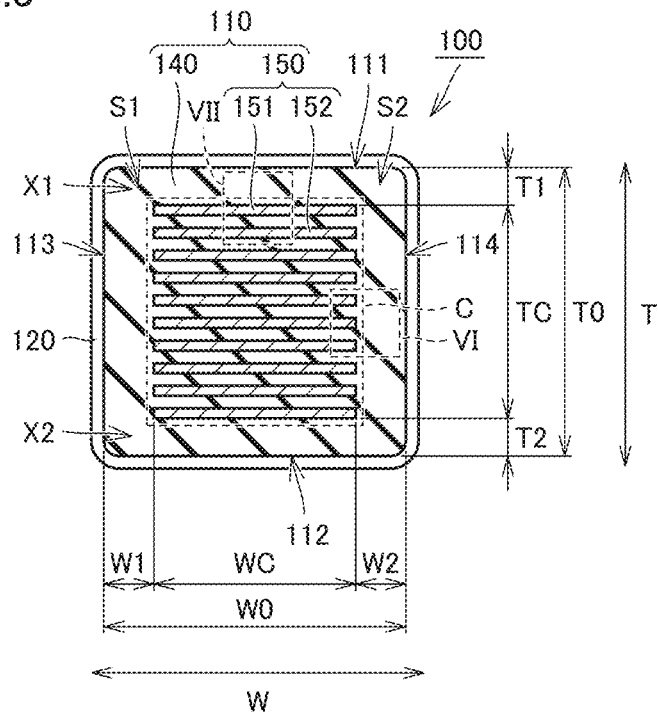
FIG. 3 is a cross section of the multilayer ceramic capacitor of FIG. 1 as seen in the direction of an arrow III-III.
Figure 4:
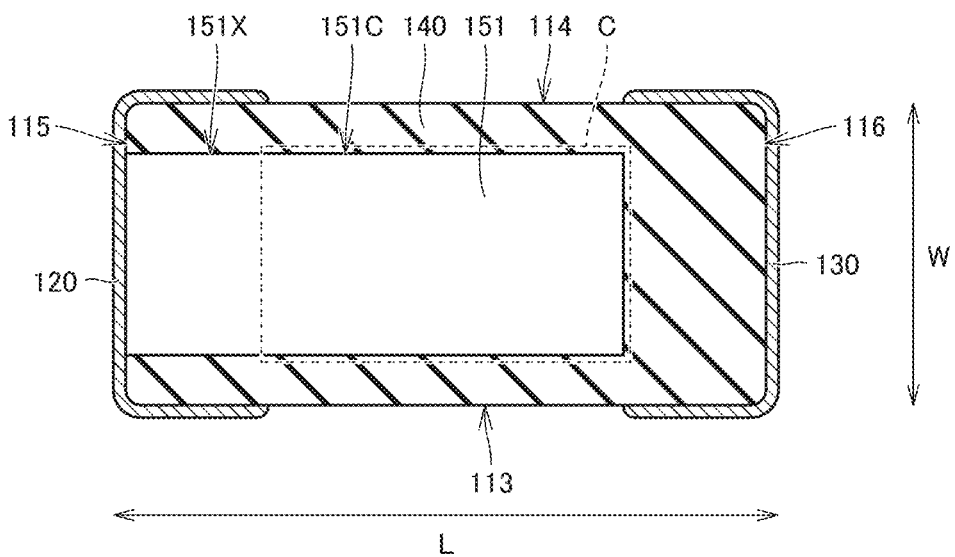
FIG. 4 is a cross section of the multilayer ceramic capacitor of FIG. 2 as seen in the direction of an arrow IV-IV.
Figure 5:
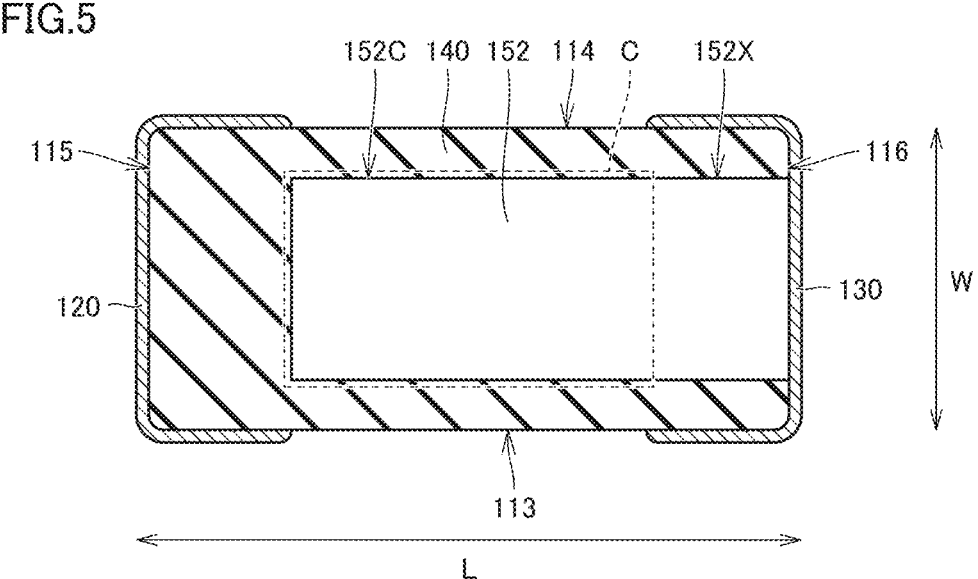
FIG. 5 is a cross section of the multilayer ceramic capacitor of FIG. 2 as seen in the direction of an arrow V-V.

FIG. 1 is a perspective view of a multilayer ceramic capacitor according to a preferred embodiment of the present invention. FIG. 2 is a cross section of the multilayer ceramic capacitor of FIG. 1 as seen in the direction of an arrow II-II. FIG. 3 is a cross section of the multilayer ceramic capacitor of FIG. 1 as seen in the direction of an arrow III-III. FIG. 4 is a cross section of the multilayer ceramic capacitor of FIG. 2 as seen in the direction of an arrow IV-IV. FIG. 5 is a cross section of the multilayer ceramic capacitor of FIG. 2 as seen in the direction of an arrow V-V. In FIGS. 1 to 5, a multilayer body, which will be described hereinafter, has a length in a direction L and a width in a direction W, and has layers stacked in a direction T.

As shown in FIGS. 1 to 5, a multilayer ceramic capacitor 100 according to a preferred embodiment of the present invention includes a multilayer body 110, a first external electrode 120, and a second external electrode 130. Multilayer body 110 includes a plurality of dielectric layers 140 and a plurality of internal electrode layers 150 alternately stacked in layer stacking direction T.

Multilayer body 110 includes a first major surface 111 and a second major surface 112 opposite to each other in layer stacking direction T, a first side surface 113 and a second side surface 114 opposite to each other in widthwise direction W orthogonal or substantially orthogonal to layer stacking direction T, and a first end surface 115 and a second end surface 116 opposite to each other in lengthwise direction L orthogonal or substantially orthogonal to both layer stacking direction T and widthwise direction W. First external electrode 120 is provided on first end surface 115. Second external electrode 130 is provided on second end surface 116.

The plurality of internal electrode layers 150 include a plurality of first internal electrode layers 151 electrically connected to first external electrode 120 and a plurality of second internal electrode layers 152 electrically connected to second external electrode 130. Although FIGS. 2 and 3 show an example in which five first internal electrode layers 151 and five second internal electrode layer 152 are provided, first and second internal electrode layers 151 and 152 are not limited in number to five layers.

As shown in FIG. 4, first internal electrode layer 151 includes a facing portion 151C that faces second internal electrode layer 152, and a lead portion 151X that is led out to first end surface 115. As shown in FIG. 5, second internal electrode layer 152 includes a facing portion 152C that faces first internal electrode layer 151, and a lead portion 152X that is led out to second end surface 116.

As shown in FIGS. 2 to 5, multilayer body 110 is sectioned by an inner layer portion C, a first outer layer portion X1 and a second outer layer portion X2, a first side margin portion S1 and a second side margin portion S2, and a first end margin portion E1 and a second end margin portion E2.

Inner layer portion C includes first and second internal electrode layers 151 and 152 with their respective facing portions 151C and 152C stacked in layers in layer stacking direction T to have a capacitance. First outer layer portion X1 is located on a side of inner layer portion C closer to first major surface 111 in layer stacking direction T. Second outer layer portion X2 is located on a side of inner layer portion C closer to second major surface 112 in layer stacking direction T.

First side margin portion S1 is located on a side of inner layer portion C closer to first side surface 113 in widthwise direction W. Second side margin portion S2 is located on a side of inner layer portion C closer to second side surface 114 in widthwise direction W. First end margin portion E1 is located on s side of inner layer portion C closer to first end surface 115 in lengthwise direction L. Second end margin portion E2 is located on a side of inner layer portion C closer to second end surface 116 in lengthwise direction L.

Multilayer body 110 have dimensions L0, W0 and T0 in lengthwise direction L, widthwise direction W and layer stacking direction T, respectively. First and second outer layer portions X1 and X2 have dimensions T1 and T2, respectively, in layer stacking direction T. First and second side margin portions S1 and S2 have dimensions W1 and W2, respectively, in widthwise direction W. First and second end margin portions E1 and E2 have dimensions L1 and L2, respectively, in lengthwise direction L. Inner layer portion C has dimensions LC, WC, and TC in lengthwise direction L, widthwise direction W, and layer stacking direction T, respectively.

In the present preferred embodiment, multilayer body 110 preferably have, for example, dimensions L0, W0, and T0 of about 1.2 mm or more, about 0.6 mm or more, and about 0.6 mm or more in lengthwise direction L, widthwise direction W and layer stacking direction T, respectively. Dimension L0 of multilayer body 110 in lengthwise direction L and dimension W0 of multilayer body 110 in widthwise direction W are dimensions as measured at a central portion of multilayer body 110 in layer stacking direction T, and dimension T0 of multilayer body 110 in layer stacking direction T is a dimension as measured at a central portion of multilayer body 110 in lengthwise direction L. The dimensions of multilayer body 110 are able to be measured with a micrometer or an optical microscope.

Multilayer body 110 preferably has rounded corners and ridges, for example. As referred to herein, a corner is a portion where three surfaces of multilayer body 110 meet, and a ridge is a portion where two surfaces of multilayer body 110 meet.

Dielectric layer 140 located in inner layer portion C preferably has a thickness of about 3 µm or more, for example. Further, first and second outer layer portions X1 and X2 preferably have dimension T1 and dimension T2, respectively, of about 100 µm or more and about 200 µm or less, for example. A thickness of dielectric layer 140 located in inner layer portion C, and dimension T1 of first outer layer portion X1 and dimension T2 of second outer layer portion X2 are measured at a central portion of multilayer body 110 in widthwise direction W.

The plurality of dielectric layers 140 each preferably include dielectric grains having a perovskite structure including at least Ti, for example, $BaTiO_3$, $CaTiO_3$, or $SrTiO_3$, as a major component. The plurality of dielectric layers 140 each preferably includes Ni, for example. Ni is included in dielectric layer 140 as at least one of a simple substance and a compound, for example, NiO. Further, the major component may include, for example, at least one of an Mg compound, an Mn compound, an Fe compound, a Ce compound, and a Co compound included in an amount smaller than that of the major component. The Mg compound is included in an amount of about 0.25% mol or less. The Mg compound included in an amount of about 0.25% mol or less is able to significantly reduce or prevent a reduction of the dielectric constant of dielectric layer 140.

First and second internal electrode layers 151 and 152 preferably include Ni, for example. First and second internal electrode layers 151 and 152 may further include dielectric grains of the same or similar type as a ceramic material included in dielectric layer 140.

First and second internal electrode layers 151 and 152 each preferably have, for example, a thickness of about 1 µm or more. The number of internal electrode layers 150 including first and second internal electrode layers 151 and 152 is preferably, for example, about 350.

Dielectric layer 140, first and second internal electrode layers 151 and 152 are able to be measured in thickness in the following method.

Initially, multilayer body 110 is ground to expose a plane thereof defined by layer stacking direction T and widthwise direction W of multilayer body 110, that is, a plane thereof orthogonal or substantially orthogonal to lengthwise direction L, and the exposed cross section is observed with a scanning electron microscope. Subsequently, dielectric layer 140 is measured in thickness on a center line passing through a center of the exposed cross section and extending in layer stacking direction T and two lines drawn on either side equidistantly from the center line for a total of five lines. An average value of these five measured values defines the thickness of dielectric layer 140.

First and second internal electrode layers 151 and 152 are also able to each be measured in thickness in a method similar to the method to measure the thickness of dielectric layer 140, in the same cross section as that in which the thickness of dielectric layer 140 is measured, with a scanning electron microscope.

First external electrode 120 is provided on the entirety or substantially the entirety of first end surface 115 of multilayer body 110 and also wraps around multilayer body 110 from first end surface 115 to first major surface 111, second major surface 112, first side surface 113, and second side surface 114. First external electrode 120 is electrically connected to first internal electrode layer 151.

Second external electrode 130 is provided on the entirety or substantially the entirety of second end surface 116 of multilayer body 110 and also wraps around multilayer body 110 from second end surface 116 to first major surface 111, second major surface 112, first side surface 113, and second side surface 114. Second external electrode 130 is electrically connected to second internal electrode layer 152.

First and second external electrodes 120 and 130 include, for example, an underlying electrode layer and a plating layer provided on the underlying electrode layer. The underlying electrode layer preferably includes at least one of a baked electrode layer, a resin electrode layer, and a thin film electrode layer, for example.

The baked electrode layer is a layer including glass and metal, and may be a single layer or a plurality of layers. The baked electrode layer, for example, preferably includes one type of metal selected from the group consisting of Ni, Cu, Ag, Pd and Au, or an alloy including that metal, and, for example, includes an alloy of Ag and Pd or the like.

The baked electrode layer is formed by applying a conductive paste including glass and metal to multilayer body 110 and baking the conductive paste. The baking may be performed at the same or substantially the same time as multilayer body 110 is fired, or may be performed after multilayer body 110 is fired.

The resin electrode layer may be, for example, a layer including conductive particles and a thermosetting resin. When forming the resin electrode layer, the baked electrode layer may not be included and the resin electrode layer may be directly formed on the multilayer body. The resin electrode layer may be a single layer or a plurality of layers.

The thin film electrode layer is preferably, for example, a layer of about 1 µm or less in which metal particles are deposited, and may be formed by a known thin film forming method, for example, sputtering or vapor deposition.

The plating layer provided on the underlying electrode layer, for example, preferably includes one type of metal selected from the group consisting of Ni, Cu, Ag, Pd and Au, or an alloy including that metal, and it includes, for example, an alloy of Ag and Pd or the like. The plating layer may be a single layer or a plurality of layers. However, the plating layer preferably has a two-layer structure in which a Sn plating layer is provided on a Ni plating layer, for example. The Ni plating layer significantly reduces or prevents the underlying electrode layer from being eroded by solder when mounting multilayer ceramic capacitor 100. The Sn plating layer significantly improves solder wettability when mounting multilayer ceramic capacitor 100.

It should be noted that first and second external electrodes 120 and 130 may each dispense with the underlying electrode layer and instead include a plating layer directly provided on multilayer body 110. Accordingly, the plating layer is directly connected to first internal electrode layer 151 or second internal electrode layer 152. Hereinafter a plating layer will more specifically be described in which first and second external electrodes 120 and 130 each do not include the underlying electrode layer and the plating layer is provided directly on multilayer body 110.

The plating layer preferably includes a first plating layer provided on multilayer body 110 and a second plating layer provided on the first plating layer, for example. However, when the plating layer is formed in an electroless plating method, a catalyst may be provided on multilayer body 110.

The first plating layer and the second plating layer each preferably include, for example, one type of metal selected from the group consisting of Cu, Ni, Sn, Pb, Au, Ag, Pd, Bi and Zn, or an alloy including that metal.

When Ni is provided as the internal electrode layer, as in the present preferred embodiment, Cu, which has high bondability to Ni, is preferably included as the first plating layer, for example. Moreover, Sn or Au, which have high solder wettability, is preferably included as the second plating layer, for example. Moreover, Ni, having a solder barrier property, may be provided as the first plating layer.

The second plating layer may be provided as needed, for example. Therefore, first and second external electrodes 120 and 130 may each include the first plating layer alone. Furthermore, first and second external electrodes 120 and 130 may each include the first plating layer and the second plating layer and in addition thereto further include another plating layer provided on the second plating layer.

The plating layer includes metal per unit volume at a ratio preferably of about 99% by volume or more, for example. Furthermore, the plating layer preferably excludes glass, for example.

Hereinafter, distribution of grain boundary segregation of Ni in the plurality of dielectric layers 140 of multilayer ceramic capacitor 100 according to the present preferred embodiment will be described.

Figure 6:
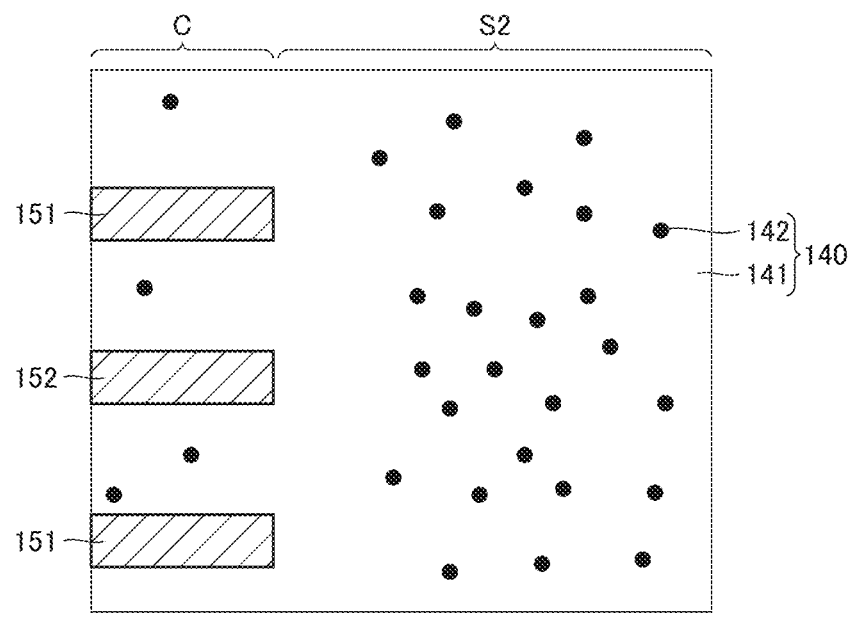
FIG. 6 is an enlarged cross section of a portion VI of the multilayer ceramic capacitor of FIG. 3.
Figure 7:
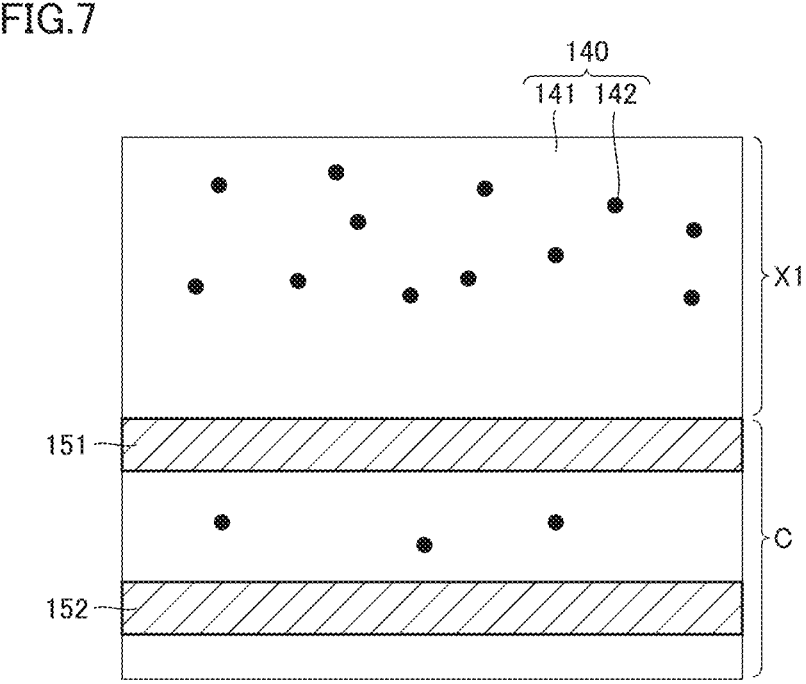
FIG. 7 is an enlarged cross section of a portion VII of the multilayer ceramic capacitor of FIG. 3.
Figure 8:
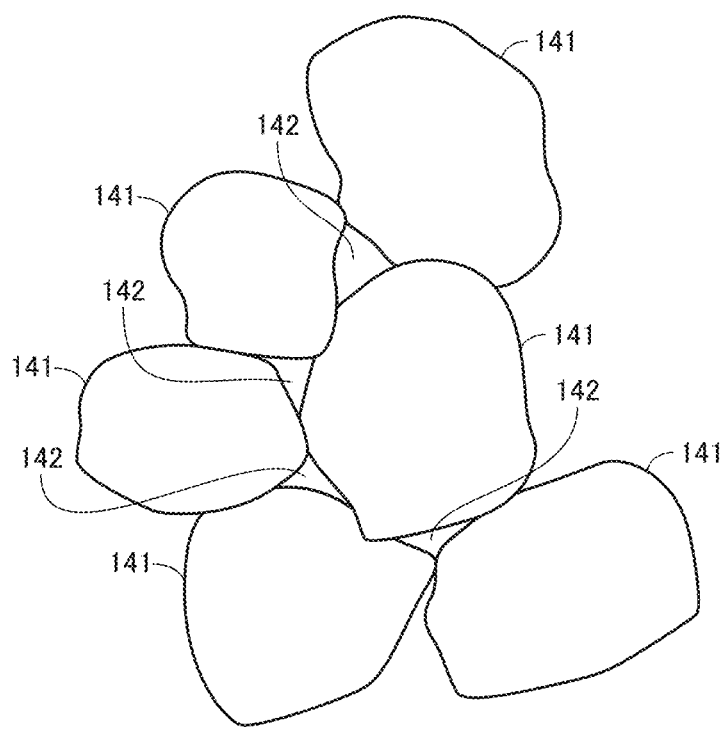
FIG. 8 is an enlarged view of a portion of a dielectric layer of a multilayer ceramic capacitor where grain boundary segregation of Ni is located according to a preferred embodiment of the present invention.

FIG. 6 is an enlarged cross section of a portion VI of the multilayer ceramic capacitor of FIG. 3. FIG. 7 is an enlarged cross section of a portion VII of the multilayer ceramic capacitor of FIG. 3. FIG. 8 is an enlarged view of a portion of the dielectric layer of a multilayer ceramic capacitor where grain boundary segregation of Ni is located according to a preferred embodiment of the present invention.

As shown in FIGS. 6 to 8, the plurality of dielectric layers 140 each include dielectric grains 141 and grain boundary segregation of Ni 142. As shown in FIG. 8, grain boundary segregation of Ni 142 is mainly located at a triple junction of grain boundaries in a polycrystalline structure.

As shown in FIG. 6, an average amount of grain boundary segregation of Ni in second side margin portion S2 is larger than an average amount of grain boundary segregation of Ni in the plurality of dielectric layers 140 at a portion located in inner layer portion C. Similarly, an average amount of grain boundary segregation of Ni in first side margin portion S1 is larger than an average amount of grain boundary segregation of Ni in the plurality of dielectric layers 140 at a portion located in inner layer portion C.

Preferably, for example, an average amount of grain boundary segregation of Ni in each of first and second side margin portions S1 and S2 is equal to or larger than about three times that of grain boundary segregation of Ni in the plurality of dielectric layers 140 at a portion located in inner layer portion C.

As shown in FIG. 7, an average amount of grain boundary segregation of Ni in first outer layer portion X1 is larger than an average amount of grain boundary segregation of Ni in the plurality of dielectric layers 140 at a portion located in inner layer portion C. Similarly, an average amount of grain boundary segregation of Ni in second outer layer portion X2 is larger than an average amount of grain boundary segregation of Ni in the plurality of dielectric layers 140 at a portion located in inner layer portion C.

Preferably, for example, an average amount of grain boundary segregation of Ni in each of first and second outer layer portions X1 and X2 is equal to or larger than about three times that of grain boundary segregation of Ni in the plurality of dielectric layers 140 at a portion located in inner layer portion C.

Hereinafter, a method to measure an average amount of grain boundary segregation of Ni will be described. Initially, multilayer body 110 is ground to expose a plane thereof defined by layer stacking direction T and widthwise direction W of multilayer body 110, that is, a plane thereof orthogonal or substantially orthogonal to lengthwise direction L, and the exposed cross section is mapped by a wavelength dispersive type X-ray (WDX) analyzer and an area ratio between dielectric grains 141 and grain boundary segregation of Ni 142 is measured. One measurement is performed in a range within a square having each side length of about 30 µm or more and about 50 µm or less. An areal occupancy (%) of grain boundary segregation of Ni 142 in dielectric layer 140 located within the measurement range is defined as an average amount of grain boundary segregation of Ni.

Hereinafter, first and second methods for manufacturing multilayer ceramic capacitor 100 according to the present preferred embodiment will be described.

Initially, a first method for manufacturing multilayer ceramic capacitor 100 according to the present preferred embodiment will be described.

In the first method for manufacturing multilayer ceramic capacitor 100, initially, a ceramic slurry including ceramic powder, a binder and a solvent is prepared. The ceramic slurry is formed into a sheet on a carrier film by a die coater, a gravure coater, a micro gravure coater, or the like to prepare an inner layer ceramic green sheet 23, an outer layer ceramic green sheet 26, and a side ceramic green sheet 25, which will be described hereinafter.

Outer layer ceramic green sheet 26 and side ceramic green sheet 25 differ from inner layer ceramic green sheet 23 only in including Ni alone or a Ni compound, for example, NiO. Specifically, when outer layer ceramic green sheet 26 and side ceramic green sheet 25 are produced, a ceramic slurry including ceramic powder, NiO powder, a binder, and a solvent may be applied.

Subsequently, a conductive paste is printed on inner layer ceramic green sheet 23 by screen printing, inkjet printing, gravure printing, or the like, for example, and has a strip-shaped pattern that provides a conductive pattern. The conductive paste includes Ni powder, an organic solvent, a binder and the like.

Figure 9:
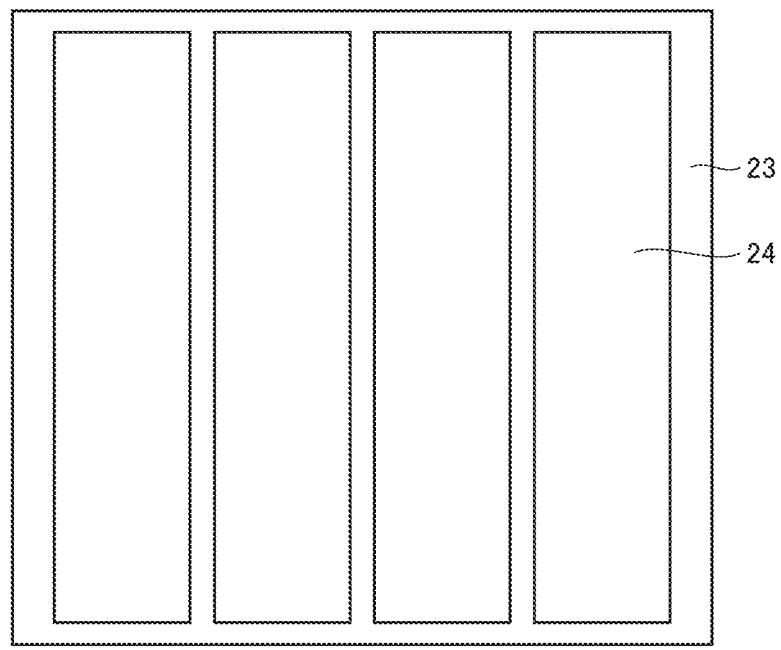
FIG. 9 is a plan view of an appearance of an inner layer ceramic green sheet with a conductive pattern provided thereon to provide a raw material sheet in a first method for manufacturing a multilayer ceramic capacitor according to a preferred embodiment of the present invention.

FIG. 9 is a plan view of an appearance of an inner layer ceramic green sheet with a conductive pattern formed thereon to define and function as a raw material sheet in the first method for manufacturing a multilayer ceramic capacitor according to a preferred embodiment of the present invention.

As shown in FIG. 9, inner layer ceramic green sheet 23, which defines and functions as dielectric layer 140 located in inner layer portion C, has a surface with a conductive pattern 24, which provides internal electrode layer 150, printed thereon, i.e., a raw material sheet is prepared.

Figure 10:
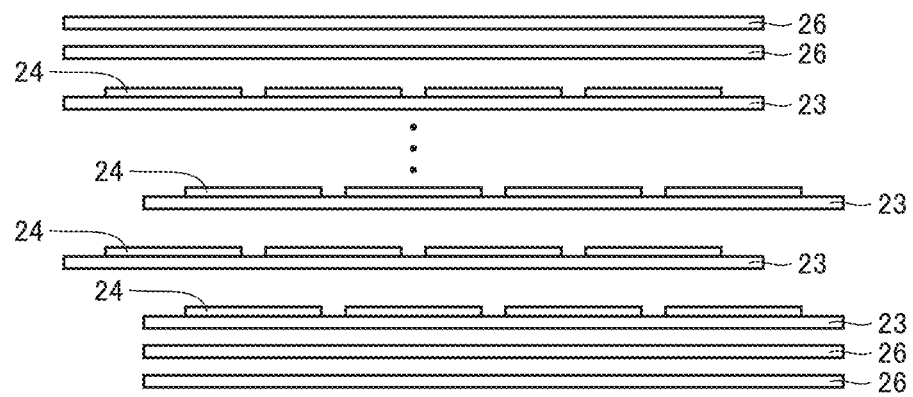
FIG. 10 shows an outer layer ceramic green sheet and the raw material sheet stacked in layers in the first method for manufacturing a multilayer ceramic capacitor according to a preferred embodiment of the present invention.

FIG. 10 shows an outer layer ceramic green sheet and the raw material sheet stacked in layers in the first method to manufacture a multilayer ceramic capacitor according to the preferred embodiment of the present invention.

As shown in FIG. 10, a plurality of raw material sheets and a plurality of outer layer ceramic green sheets 26 are stacked in layers. Specifically, a plurality of raw material sheets are stacked in layers, and inner layer ceramic green sheets 23 have their respective strip-shaped conductive patterns 24 extending in the same or substantially the same direction, with adjacent raw material sheets having their respective strip-shaped conductive patterns 24 offset in the widthwise direction by a half pitch. The plurality of outer layer ceramic green sheets 26 are stacked on opposite sides of the plurality of stacked raw material sheets in the layer stacking direction.

Figure 11:
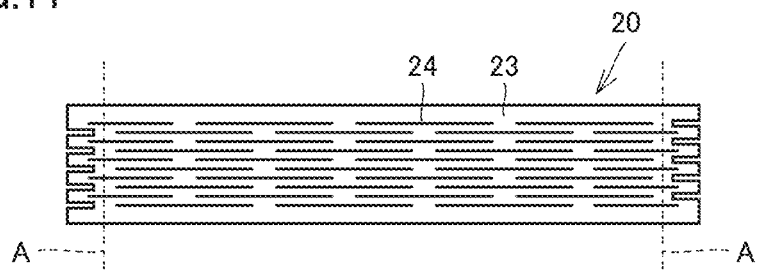
FIG. 11 shows the stacked outer layer ceramic green and raw material sheets thermocompression-bonded to provide a structure in the first method for manufacturing a multilayer ceramic capacitor according to a preferred embodiment of the present invention.

FIG. 11 shows the stacked outer layer ceramic green and raw material sheets thermocompression-bonded to provide a structure in the first method for manufacturing a multilayer ceramic capacitor according to the present preferred embodiment of the present invention.

As shown in FIG. 11, the stacked outer layer ceramic green 26 and raw material sheets are thermocompression-bonded to form a structure which in turn has a peripheral portion cut along a cutting line A, as shown in FIG. 11, and thus removed to produce a mother block 20.

Thus, mother block 20 will have a flat, rectangular parallelepiped or substantially rectangular parallelepiped external shape, and will have a structure in which a plurality of inner layer ceramic green sheets 23 and a plurality of outer layer ceramic green sheets 26 that provide dielectric layers 140, and a plurality of conductive patterns 24 that provides internal electrode layer 150 are stacked in layers. A portion of conductive pattern 24 is exposed at each of four peripheral end surfaces of mother block 20.

Figure 12:
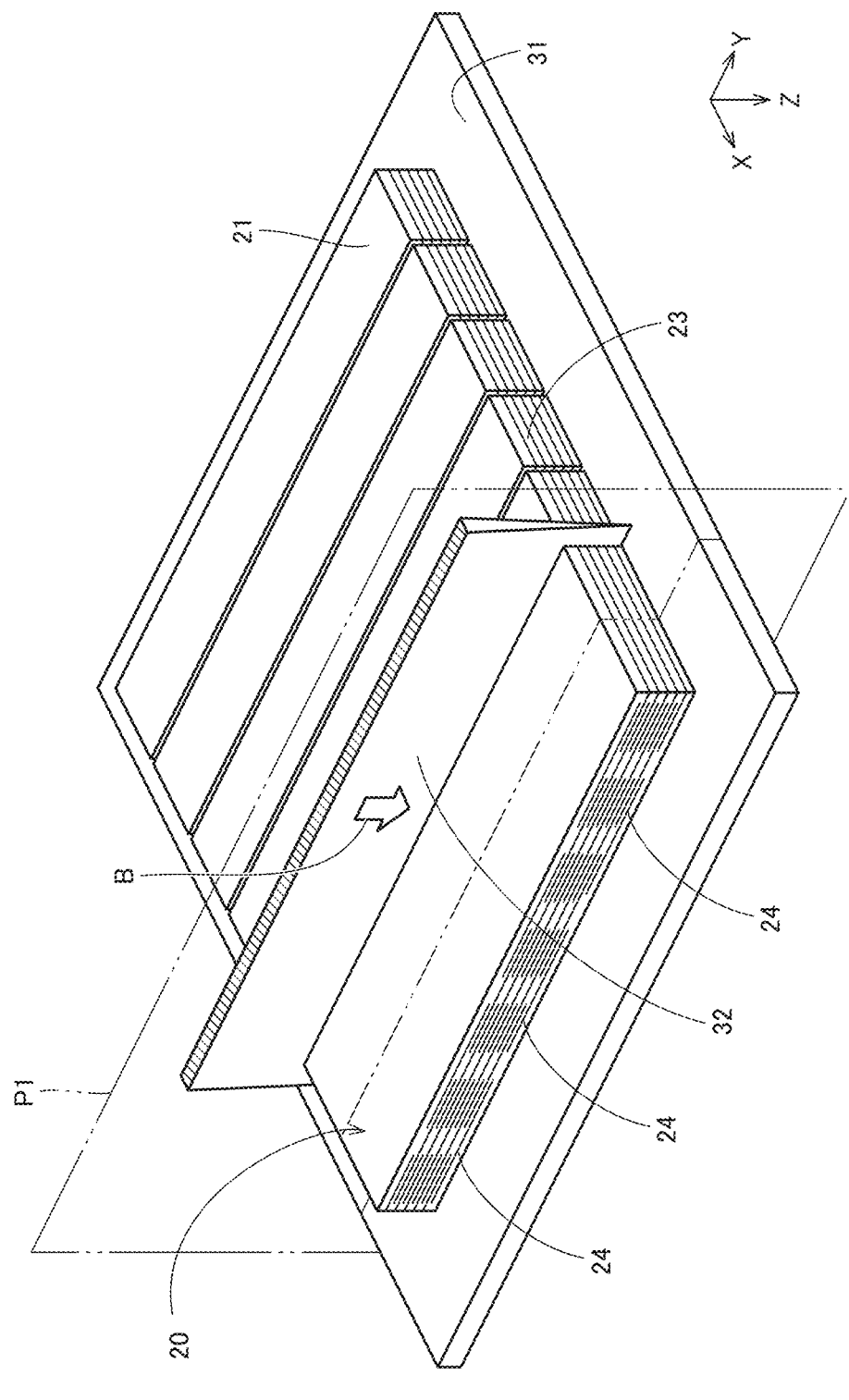
FIG. 12 is a perspective view showing a mother block cut along a first dividing plane in the first method for manufacturing a multilayer ceramic capacitor according to a preferred embodiment of the present invention.

FIG. 12 is a perspective view showing a mother block cut along a first dividing plane in the first method for manufacturing a multilayer ceramic capacitor according to the present preferred embodiment of the present invention.

As shown in FIG. 12, in the first dividing step, mother block 20 is divided into rows along a first dividing plane P1 (a Y-Z plane) parallel or substantially parallel to a direction in which the plurality of strip-shaped conductive patterns 24 are aligned (that is, a direction along a Y-axis shown in the figure) and also parallel or substantially parallel to a direction in which the plurality of conductive patterns 24 are stacked in layers (that is, a direction along a Z-axis in the figure). The division may be performed by, for example, press-cutting by a press-cutting blade or by dicing by a cutting blade, or by laser cutting or the like. FIG. 12 shows an example of press-cutting by a press-cutting blade 32.

More specifically, in the division, press-cutting blade 32 is provided in the direction in which the plurality of strip-shaped conductive patterns 24 are aligned (i.e., the direction along the Y-axis in the figure), and press-cutting blade 32 is pressed into mother block 20 along first dividing plane P1 (the Y-Z plane) in a direction parallel or substantially parallel to the direction in which the plurality of conductive patterns 24 are stacked in layers (i.e., the direction along the Z-axis in the figure) (that is, a direction indicated by an arrow B in the figure) to cut a single multilayer block 21 out of mother block 20.

In the division, press-cutting blade 32 is relatively moved at a fixed pitch in a direction in which the strip-shaped conductive pattern 24 extends (that is, a direction along the X-axis in the figure), and whenever press-cutting blade 32 is thus moved, it press-cuts mother block 20 to cut it into a plurality of individual multilayer blocks 21.

As a result, the plurality of multilayer blocks 21 will have a rectangular parallelepiped or substantially rectangular parallelepiped external shape, and will include as a portion of its external surface a pair of first cut surfaces which are parallel or substantially parallel to the direction in which the plurality of strip-shaped conductive patterns 24 are aligned (i.e., the direction along the Y-axis in the figure) and are also parallel or substantially parallel to the direction in which the plurality of conductive patterns 24 are stacked in layers (i.e., the direction along the Z-axis in the figure).

Figure 13:
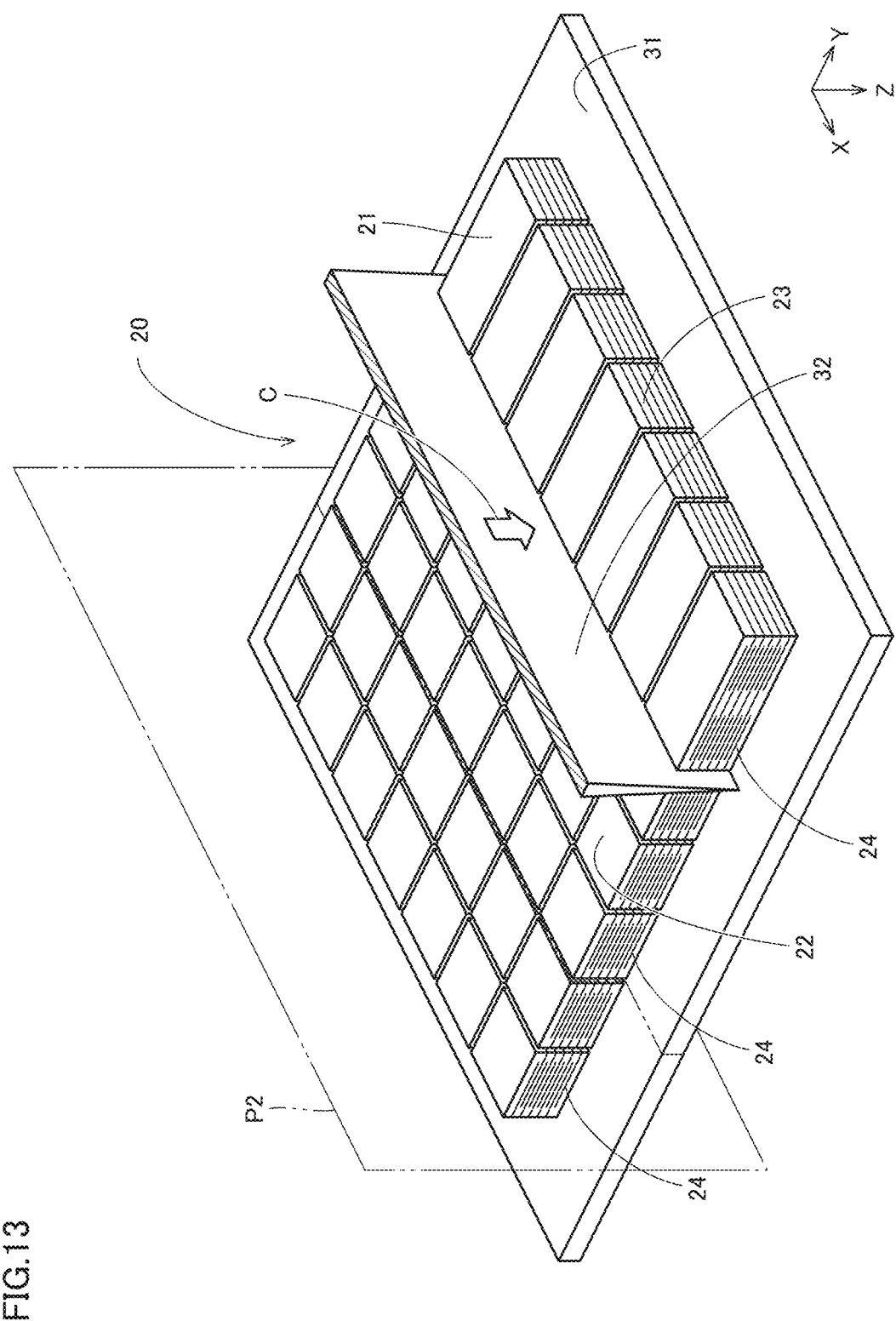
FIG. 13 is a perspective view showing a plurality of multilayer blocks cut along a second dividing plane in the first method for manufacturing a multilayer ceramic capacitor according to a preferred embodiment of the present invention.

FIG. 13 is a perspective view showing a plurality of multilayer blocks cut along a second dividing plane in the first method for manufacturing a multilayer ceramic capacitor according to the present preferred embodiment of the present invention.

As shown in FIG. 13, in a second dividing step, the plurality of multilayer blocks 21 are collectively divided into columns along a second dividing plane P2 (a X-Z plane) which is parallel or substantially parallel to a direction in which the plurality of strip-shaped conductive patterns 24 extend (that is, the direction along the X-axis shown in the figure) and also parallel or substantially parallel to a direction orthogonal or substantially orthogonal to the pair of first cut surfaces (that is, the direction along the Z-axis in the figure). The division is performed by, for example, press-cutting by press-cutting blade 32.

More specifically, in the division, press-cutting blade 32 is provided in the direction in which the plurality of strip-shaped conductive patterns 24 of the plurality of multilayer blocks extend (i.e., the direction along the X-axis shown in the figure) and press-cutting blade 32 is pressed into mother block 20 along second dividing plane P2 (i.e., the X-Z plane) in a direction parallel or substantially parallel to a direction orthogonal or substantially orthogonal to the pair of first cut surfaces (i.e., the direction along the Z-axis in the figure) (that is, a direction indicated by an arrow C in the figure) to cut a single multilayer chip 22 out of each of the plurality of multilayer blocks 21.

In the division, press-cutting blade 32 is relatively moved at a fixed pitch in a direction parallel or substantially parallel to the direction in which strip-shaped conductive patterns 24 are aligned (i.e., the direction along the Y-axis in the figure), and whenever press-cutting blade 32 is so moved, it press-cuts each of the plurality of multilayer blocks 21 into a plurality of individual multilayer chips 22.

Figure 14:
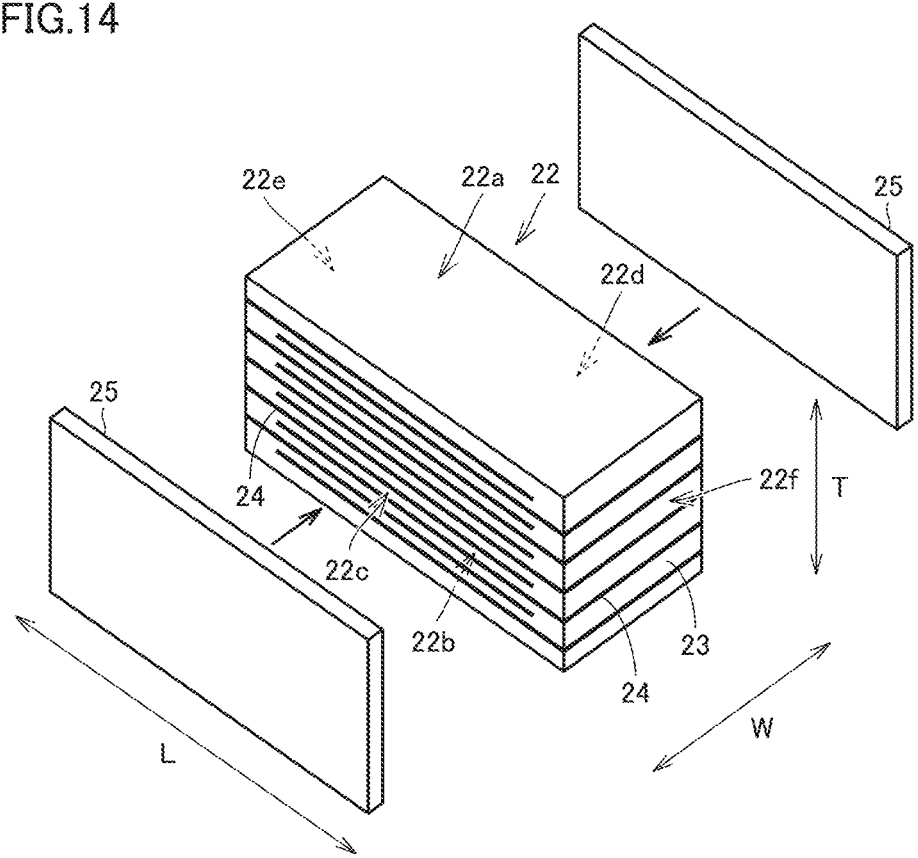
FIG. 14 is a perspective view of attaching a side ceramic green sheet to a multilayer chip in the first method for manufacturing a multilayer ceramic capacitor according to a preferred embodiment of the present invention.

FIG. 14 is a perspective view of attaching a side ceramic green sheet to a multilayer chip in the first method to manufacture a multilayer ceramic capacitor according to the present preferred embodiment of the present invention.

As shown in FIG. 14, multilayer chip 22 includes a first major surface 22a and a second major surface 22b opposite to each other in layer stacking direction T, a first side surface 22c and a second side surface 22d opposite to each other in widthwise direction W orthogonal or substantially orthogonal to layer stacking direction T, and a first end surface 22e and a second end surface 22f opposite to each other in lengthwise direction L.

Side ceramic green sheet 25 is attached to each of first and second side surfaces 22c and 22d of multilayer chip 22 by an adhesive.

Figure 15:
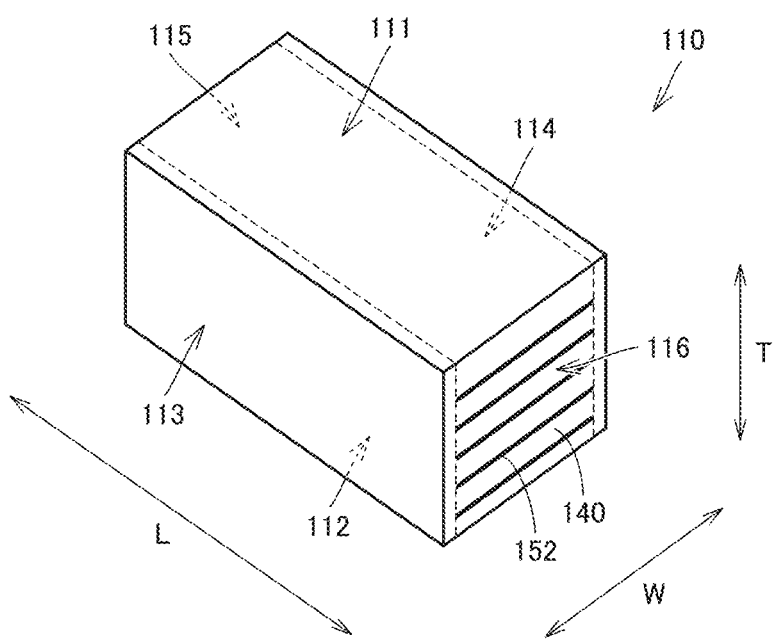
FIG. 15 is a perspective view of an appearance of a multilayer body formed in the first method for manufacturing a multilayer ceramic capacitor according to a preferred embodiment of the present invention.

FIG. 15 is a perspective view of an appearance of a multilayer body formed in the first method for manufacturing a multilayer ceramic capacitor according to the present preferred embodiment of the present invention. Multilayer chip 22 with side ceramic green sheet 25 attached thereto is heated to sinter the ceramic material, and subsequently barrel-finished to form multilayer body 110 as shown in FIG. 15.

A conductive paste is applied to each of first and second end surfaces 115 and 116 of multilayer body 110 to form a metal layer which is in turn baked and thereafter plated with Ni followed by Sn to form first and second external electrodes 120 and 130.

Multilayer ceramic capacitor 100 according to the present preferred embodiment is able to be manufactured through the series of steps of the first manufacturing method described above.

Hereinafter, a second method for manufacturing multilayer ceramic capacitor 100 according to the present preferred embodiment will be described.

Initially, inner and outer layer ceramic green sheets 23 and 26 including a dielectric ceramic material as a major component, a conductive paste including Ni powder as a conductive material for an internal electrode, and a conductive paste for an external electrode are prepared.

Figure 16:
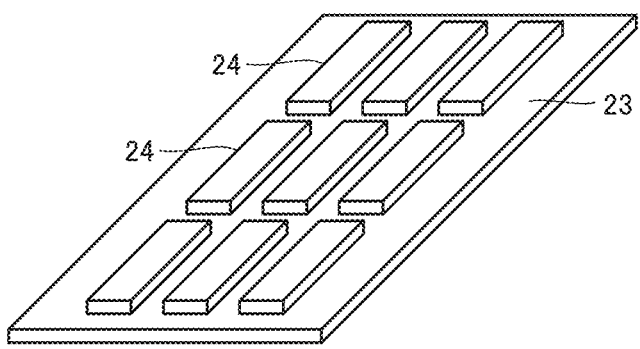
FIG. 16 is a perspective view of an appearance of an inner layer ceramic green sheet with a conductive pattern provided thereon to provide a raw material sheet in a second method for manufacturing a multilayer ceramic capacitor according to a preferred embodiment of the present invention.

FIG. 16 is a perspective view of an inner layer ceramic green sheet with a conductive pattern formed thereon to provide a raw material sheet in the second method for manufacturing a multilayer ceramic capacitor according to a preferred embodiment of the present invention.

As shown in FIG. 16, inner layer ceramic green sheet 23, which defines and functions as dielectric layer 140 located in inner layer portion C, includes a surface with conductive pattern 24, which defines and functions as internal electrode layer 150, printed thereon, i.e., a raw material sheet is prepared.

Figure 17:
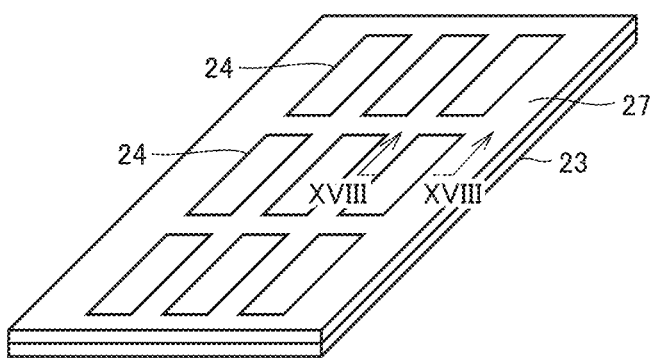
FIG. 17 is a perspective view of an appearance of an inner layer ceramic green sheet with a dielectric pattern provided thereon to provide a raw material sheet in the second method for manufacturing a multilayer ceramic capacitor according to a preferred embodiment of the present invention.

FIG. 17 is a perspective view of an inner layer ceramic green sheet with a dielectric pattern formed thereon to provide a raw material sheet in the second method for manufacturing a multilayer ceramic capacitor according to the present preferred embodiment of the present invention.

As shown in FIG. 17, a ceramic paste is printed on inner layer ceramic green sheet 23 at a portion free of conductive pattern 24 to form a dielectric pattern 27. The ceramic paste includes a ceramic material which differs from a ceramic material forming inner layer ceramic green sheet 23 only in that the former includes Ni alone or a Ni compound, for example, NiO. Specifically, the ceramic paste includes NiO powder.

When Ni is unevenly distributed in a side gap portion, for example, a plurality of types of ceramic paste including Ni at different ratios are able to be prepared and printed sequentially and adjacently.

Figure 18:
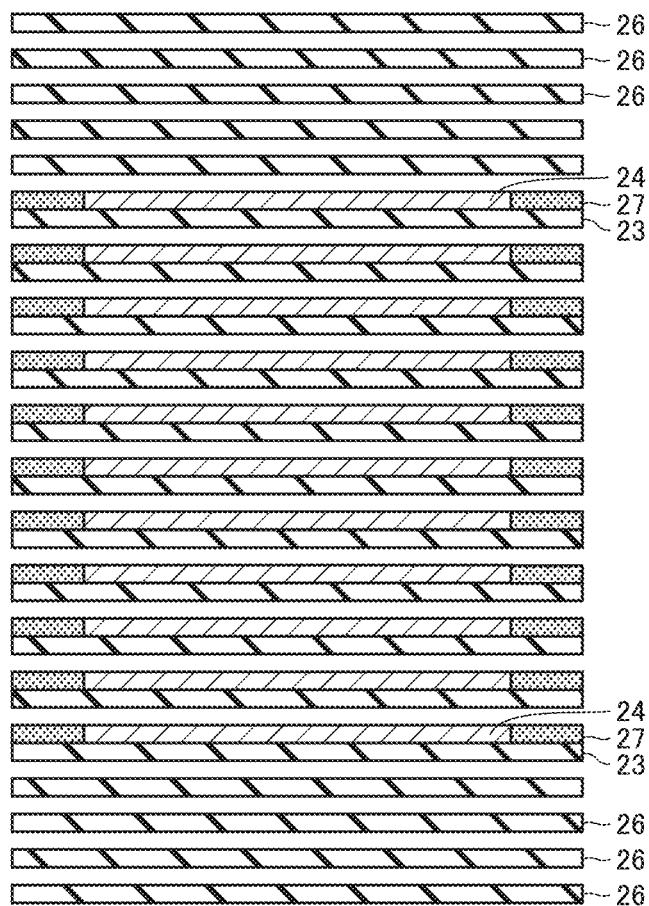
FIG. 18 shows an outer layer ceramic green sheet and the raw material sheet stacked in layers in the second method for manufacturing a multilayer ceramic capacitor according to a preferred embodiment of the present invention.

FIG. 18 shows an outer layer ceramic green sheet and the raw material sheet stacked in layers in the second method for manufacturing a multilayer ceramic capacitor according to the present preferred embodiment of the present invention.

As shown in FIG. 18, a plurality of raw material sheets and a plurality of outer layer ceramic green sheets 26 are stacked in layers. Specifically, the raw material sheet shown in FIG. 17 is stacked on another sheet, and the sheets are alternately staggered in the lengthwise direction by a predetermined distance. The plurality of outer layer ceramic green sheets 26 are stacked in layers on opposite sides of the plurality of stacked raw material sheets in the layer stacking direction.

Figure 19:
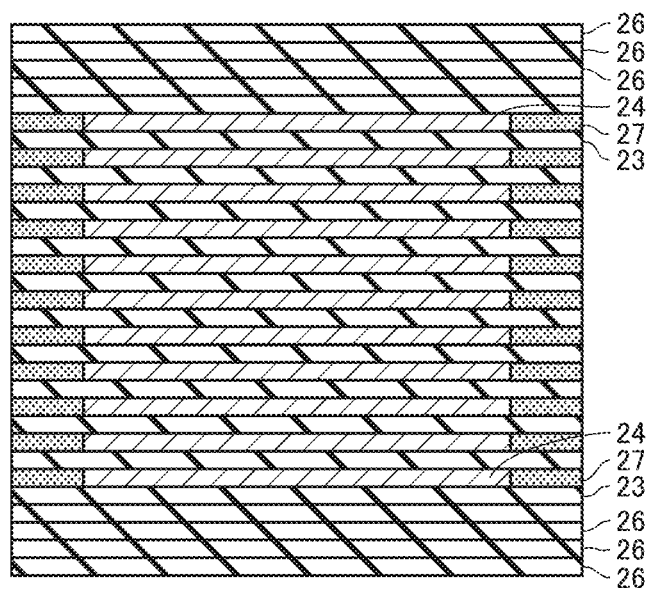
FIG. 19 shows the stacked outer layer ceramic green and raw material sheets thermocompression-bonded to provide a structure in the second method for manufacturing a multilayer ceramic capacitor according to a preferred embodiment of the present invention.

FIG. 19 shows the stacked outer layer ceramic green and raw material sheets thermocompression-bonded to form a structure in the second method for manufacturing a multilayer ceramic capacitor according to the present preferred embodiment of the present invention.

As shown in FIG. 19, the stacked outer layer ceramic green 26 and raw material sheets are thermocompression-bonded to form a mother block.

Figure 20:
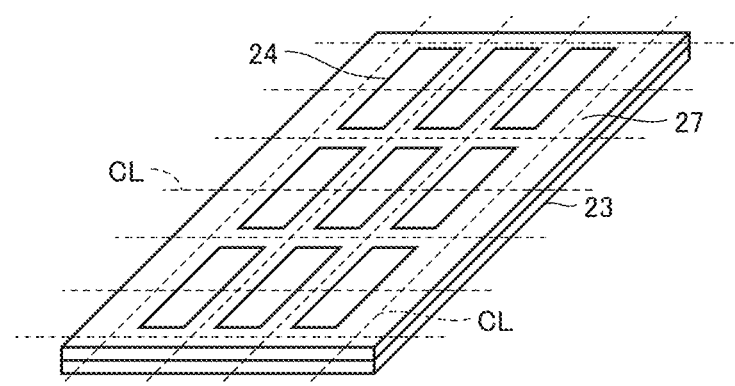
FIG. 20 is a perspective view showing a mother block cut along a cutting line in the second method for manufacturing a multilayer ceramic capacitor according to a preferred embodiment of the present invention.

FIG. 20 is a perspective view showing a mother block cut along a cutting line in the second method for manufacturing a multilayer ceramic capacitor according to the present preferred embodiment of the present invention.

As shown in FIG. 20, the mother block is cut along a cutting line CL to cut out a multilayer chip. In FIG. 20, for the sake of convenience, cutting line CL is shown on a single raw material sheet. The multilayer chip may be polished in a method, for example, barrel finishing, to round the multilayer's ridges and corners.

Subsequently, the multilayer chip is fired to form multilayer body 110. The multilayer chip is preferably fired, for example, at about 900° C. or higher and about 1300° C. or lower.

Subsequently, a conductive paste is applied to each of first and second end surfaces 115 and 116 of multilayer body 110 to form a metal layer which is in turn baked and thereafter plated with Ni followed by Sn to form first and second external electrodes 120 and 130.

Multilayer ceramic capacitor 100 according to the present preferred embodiment is able to thus be manufactured through the series of steps of the second manufacturing method described above.

In the present preferred embodiment, dielectric layer 140 preferably includes dielectric grains having, for example, an average grain diameter of about 180 nm or more and about 220 nm or less, and an average grain diameter of dielectric grains included in dielectric layer 140 located in inner layer portion C and that of dielectric grains included in each of first and second side margin portions S1 and S2 have a difference of about ±10% or less. Further, the average grain diameter of the dielectric grains included in dielectric layer 140 located in inner layer portion C and that of dielectric grains included in each of first and second outer layer portions X1 and X2 has a difference of about ±10% or less.

The dielectric grains' average grain diameter may be measured in the following method. Initially, multilayer body 110 is polished until a plane including widthwise direction W and layer stacking direction T is exposed at a central portion in lengthwise direction L to expose a cross section.

When measuring the average grain diameter of the dielectric grains in each of first and second side margin portions S1 and S2, an electron microscope may be used to capture an image of multilayer body 110 at a magnification of about 20,000 times at a central portion in layer stacking direction T at a portion inner than first or second side surface 113 or 114 by about 20 μm.

When measuring the average grain diameter of the dielectric grains in each of first and second outer layer portions X1 and X2, an electron microscope, for example, may be used to capture an image of multilayer body 110 at a magnification of about 20,000 times at a central portion in widthwise direction W at a portion inner than first or second major surface 111 or 112 by about 20 μm.

200 dielectric grains are randomly selected in the captured image, and image-processed to measure the dielectric grains' cross-sectional areas. From the cross-sectional areas, their diameters are calculated and averaged by the 200 dielectric grains to obtain an average grain diameter.

In multilayer ceramic capacitor 100 according to the present preferred embodiment, an average amount of grain boundary segregation of Ni in each of first and second side margin portions S1 and S2 is larger than that of grain boundary segregation of Ni in the plurality of dielectric layers 140 at a portion located in inner layer portion C.

As a result, in manufacturing multilayer ceramic capacitor 100, a firing step is performed while grain growth of dielectric grains in a specific region, that is, grain growth of the dielectric grains in each of first and second side margin portions S1 and S2, is significantly reduced or prevented.

If first and second side margin portions S1 and S2 each have dielectric grains abnormally grown, stress accumulates in multilayer body 110, and when an impact is externally received, a breakage may occur and cracking may be developed therefrom and propagate to internal electrode layer 150. Accordingly, multilayer ceramic capacitor 100 has significantly reduced moisture resistance and thus significantly reduced insulation resistance. Further, when Si discharged from the abnormal grain growth portion moves inside multilayer body 110, the Si cuts internal electrode layer 150 and from the cut portion, internal electrode layer 150 starts to peel off dielectric layer 140, and as a result, multilayer ceramic capacitor 100 has significantly reduced heat resistance.

Multilayer ceramic capacitor 100 according to the present preferred embodiment includes dielectric grains in which abnormal grain growth is significantly reduced or prevented, and even when first and second side margin portion S1 and S2 have breakage which may result in cracking, the cracking is able to be significantly reduced or prevented from propagating to internal electrode layers 150 and thus a reduction in the moisture resistance of multilayer ceramic capacitor 100 is able to be significantly reduced or prevented.

Furthermore, multilayer ceramic capacitor 100 according to the present preferred embodiment that includes dielectric grains in which abnormal grain growth is significantly reduced or prevented to thereby significantly reduce or prevent discharge of Si from abnormal grain growth portion (s), and thus reduction in the heat resistance of multilayer ceramic capacitor 100.

When an average amount of grain boundary segregation of Ni in the plurality of dielectric layers 140 at a portion located in inner layer portion C is substantially equal to or larger than that of grain boundary segregation of Ni in each of first and second side margin portions S1 and S2, Ni segregated at a grain boundary affects characteristics of the multilayer ceramic capacitor, for example, reliability in insulation and dielectric characteristics. Accordingly, increasing the average amount of grain boundary segregation of Ni in each of first and second side margin portions S1 and S2 to be larger than that of grain boundary segregation of Ni in the plurality of dielectric layers 140 at the portion located in inner layer portion C is able to significantly reduced or prevented a reduction in moisture resistance and heat resistance while maintaining a variety of types of electrical characteristics to provide a significantly reliable multilayer ceramic capacitor.

Preferably, for example, an average amount of grain boundary segregation of Ni in each of first and second side margin portions S1 and S2 is equal to or larger than about three times that of grain boundary segregation of Ni in the plurality of dielectric layers 140 at a portion located in inner layer portion C.

As Ni diffuses from internal electrode layer 150 to a portion of the plurality of dielectric layers 140 located in inner layer portion C, an average amount of grain boundary segregation of Ni in each of first and second side margin portions S1 and S2 distant from internal electrode layer 150 that is equal to or larger than about three times that of grain boundary segregation of Ni in the plurality of dielectric layers 140 at a portion located in inner layer portion C is able to significantly reduce or prevent abnormal grain growth of the dielectric grains included in dielectric layer 140 and hence reduction in the moisture resistance and heat resistance of multilayer ceramic capacitor 100.

Preferably, for example, an average amount of grain boundary segregation of Ni in each of first and second outer layer portions X1 and X2 is larger than that of grain boundary segregation of Ni in the plurality of dielectric layers 140 at a portion located in inner layer portion C. This allows multilayer ceramic capacitor 100 to be manufactured with a firing step performed while significantly reducing or preventing grain growth of dielectric grains in each of first and second outer layer portions X1 and X2. As a result, abnormal grain growth of dielectric grains included in dielectric layer 140 is able to be significantly reduced or prevented.

The average amount of grain boundary segregation of Ni in each of first and second outer layer portions X1 and X2 is not necessarily larger than that of grain boundary segregation of Ni in the plurality of dielectric layers 140 at a portion located in inner layer portion C.

Preferably, for example, the average amount of grain boundary segregation of Ni in each of first and second outer layer portions X1 and X2 is equal to or larger than about three times that of grain boundary segregation of Ni in the plurality of dielectric layers 140 at a portion located in inner layer portion C.

Accordingly, abnormal grain growth of dielectric grains included in dielectric layer 140 is able to be significantly reduced or prevented, and thus a reduction in moisture resistance and heat resistance of multilayer ceramic capacitor 100 is able to be significantly reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers and a plurality of internal electrode layers alternately stacked in a layer stacking direction, and including a first major surface and a second major surface opposite to each other in the layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to both the layer stacking direction and the widthwise direction;
a first external electrode provided on the first end surface; and
a second external electrode provided on the second end surface; wherein
the plurality of internal electrode layers include a first internal electrode layer electrically connected to the first external electrode and a second internal electrode layer electrically connected to the second external electrode;
the multilayer body includes an inner layer portion in which the first and second internal electrode layers include portions, respectively, facing each other and stacked in the layer stacking direction to provide a capacitance, a first outer layer portion located on a side of the inner layer portion closer to the first major surface in the layer stacking direction, a second outer layer portion located on a side of the inner layer portion closer to the second major surface in the layer stacking direction, a first side margin portion located on a side of the inner layer portion closer to the first side surface in the widthwise direction, and a second side margin portion located on a side of the inner layer portion closer to the second side surface in the widthwise direction;

the plurality of internal electrode layers each include Ni;
the plurality of dielectric layers each include Ni;
the first and second side margin portions each have an average amount of grain boundary segregation of Ni equal to or larger than about three times an average amount of grain boundary segregation of Ni in the plurality of dielectric layers at a portion located in the inner layer portion.

2. The multilayer ceramic capacitor according to claim 1, wherein the first and second outer layer portions each have an average amount of grain boundary segregation of Ni larger than that of grain boundary segregation of Ni in the plurality of dielectric layers at the portion located in the inner layer portion.

3. The multilayer ceramic capacitor according to claim 2, wherein the first and second outer layer portions each have an average amount of grain boundary segregation of Ni equal to or larger than about three times that of grain boundary segregation of Ni in the plurality of dielectric layers at the portion located in the inner layer portion.

4. The multilayer ceramic capacitor according to claim 1, the first internal electrode layer includes a first lead portion that is exposed at the first end surface, and the second internal electrode layer includes a second lead portion that is exposed at the second end surface.

5. The multilayer ceramic capacitor according to claim 1, wherein corners and ridges of the multilayer body are rounded.

6. The multilayer ceramic capacitor according to claim 1, wherein a thickness of each of the first and second outer layer portions is in a range of about 100 μm to about 200 μm.

7. The multilayer ceramic capacitor according to claim 1, wherein each of the plurality of dielectric layers includes dielectric grains having a perovskite structure including at least Ti.

8. The multilayer ceramic capacitor according to claim 7, wherein each of the first and second internal electrode layers includes dielectric grains with a perovskite structure including at least Ti.

9. The multilayer ceramic capacitor according to claim 1, wherein each of the plurality of dielectric layers includes an Mg compound in an amount of about 0.25% mol or less.

10. The multilayer ceramic capacitor according to claim 1, wherein the first external electrode covers an entirety or substantially an entirety of the first end surface and the second external electrode covers an entirety or substantially an entirety of the second end surface.

11. The multilayer ceramic capacitor according to claim 1, wherein each of the first and second external electrodes includes an underlying electrode layer and a plating layer provided on the underlying electrode layer.

12. The multilayer ceramic capacitor according to claim 1, wherein the first external electrode includes a plating layer provided directly on the first end surface of the multilayer body, and the second external electrode includes a plating layer provided directly on the second end surface of the multilayer body.

13. The multilayer ceramic capacitor according to claim 12, wherein the plating layer of each of the first and second external electrodes includes Cu.

* * * * *